Feb. 3, 1953 R. H. SECHRIST 2,627,431
MEANS FOR FASTENING OBJECTS TO CYLINDRICAL BODIES
Filed Aug. 29, 1946
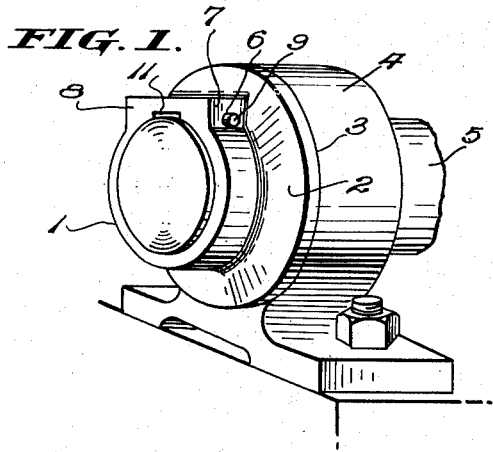
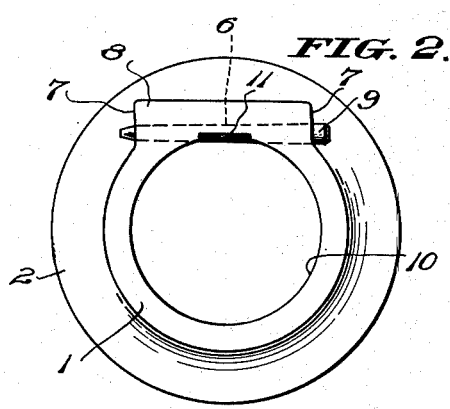
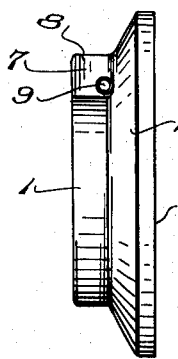
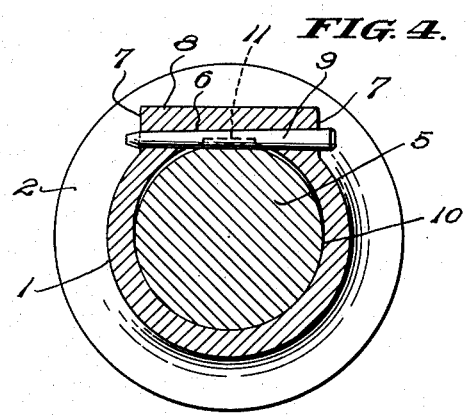
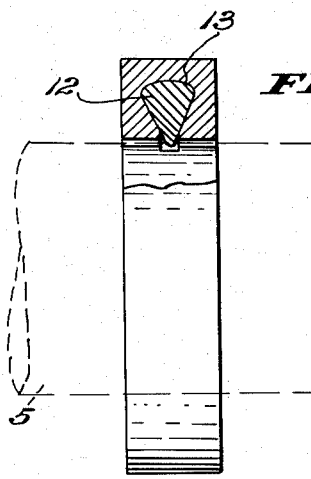
Inventor
Roy H. Sechrist
By W. S. McDowell
Attorney Patented Feb. 3, 1953

2,627,431

UNITED STATES PATENT OFFICE 2,627,431

MEANS FOR FASTENING OBJECTS TO CYLINDRICAL BODIES

Roy H. Sechrist, Marion, Ohio

Application August 29, 1946, Serial No. 693,784

1 Claim. (Cl. 287—52.05)

This invention relates to an improved pin-locking shaft collar, having particular reference to shaft collars of the type employed on shafting, rods, pipes and other cylindrical members for retaining the latter against undesired longitudinal movement with respect to associated supporting bearings provided in various types of machines and other structures, and also to means adapted to secure gears to a shaft for driving relation therewith.

It is customary to secure a position-retaining collar to an associated shaft by providing both the collar and shaft with registering drilled openings for the reception of a transversely extending fastening element. Drilling of a shaft to provide such an opening is a relatively slow and costly operation, usually accomplished with the employment of jigs and, moreover, the operation does not admit of any material longitudinal adjustment in the applied position of the collar on its shaft. Again, the strength of the shaft is reduced by the presence of such a drilled opening.

It is also common practice to employ a positioning collar which is provided with a setting or tensioning screw which frictionally engages the associated shaft to obtain a clamping action. It will be manifest that collars of this latter type are easily loosened upon a shaft when subjected to prolonged vibration, and consequently will become inoperative and allow undesired slippage.

Accordingly, it is an object of the present invention to provide a shaft collar which may be securely fastened to an associated shaft without drilling or forming openings in the shaft.

It is another object of the invention to provide a shaft collar which may be securely fastened to an associated shaft in any desired longitudinal position thereon.

It is another object of the invention to provide a shaft collar which is convenient to apply to a shaft, economical in manufacture and less costly to install.

It is a further object of the present invention to provide a position-retaining collar which, when locked in its operative position upon a shaft, will not slip or shake loose due to vibration normally accompanying such a driven mechanism, and which when so locked, will deny slippage due to end thrust and rotational forces.

With these and other objects in view, my invention consists in the provision of a shaft collar having formed in one side thereof a transversely extending opening, which partially intersects the shaft-receiving bore of the collar, the said opening being adapted to receive a tapered pin which, when driven into the opening, with the collar positioned on a shaft, provides a progressively tightening wedge between the collar and the shaft, and/or distorts the configuration of the collar, thereby exerting holding forces thereon which prevent displacement of the collar from the shaft until the pin is removed.

For a further understanding of the invention, reference is to be had to the following description and the accompanying drawings, wherein:

Fig. 1 is a perspective view of my improved shaft collar disclosing the same in its operative position on a shaft;

Fig. 2 is a front elevational view of the collar;

Fig. 3 is an edge elevational view thereof;

Fig. 4 is a vertical transverse sectional view;

Fig. 5 is an edge elevational view, partly in vertical section, showing a modified form of locking pin.

Referring more particularly to the drawings, my improved locking collar comprises a substantially annular body 1 which, advantageously, may be formed from malleable iron, although other suitable materials may be utilized. The collar at one side is formed with an enlarged annular flange 2, having a flat side face 3 which may be engaged, for example, with the complemental face provided on a bearing 4 through which a shaft 5 extends.

To lock the collar on the shaft 5, with the face 3 thereof in contact with or in close proximity to the bearing 4, the body 1 is provided at one side thereof with a transverse opening 6, the ends of the opening terminating in registration with the flat faces 7 formed on a lateral extension 8 of the body of the collar. A tapered pin 9 is adapted to be driven into the opening 6. Since the opening is so formed that it intersects at one side the shaft-receiving bore 10 of the collar, it follows that when the pin is driven fully into the opening 6, the side of the pin will engage the side of the shaft, in the manner of a wedge to progressively tighten the connection between the collar and the shaft by drawing the collar tightly about the shaft in the region of the collar opposite the pin. Also in driving the pin, the forces exerted thereby will cause the bore of the collar to become resiliently distorted so as to present an increased clamping area to the shaft, such distortion will naturally correspond to the curvature of the shaft, and will impart a frictional grip along approximately one-half of the shaft perimeter. If this distortion did not take place, gripping or clamping action of the collar would be limited to only two places, namely, the surface in contact with the pin and the small surface directly opposite the pin.

It will be manifest that when using the collar upon a hardened or tempered shaft, it will be impossible for the pin to form or cut a tangential groove therein. Nevertheless, due to the tapered configuration of the pin, a sufficient wedging force will be produced, upon driving the pin, to resiliently distort the collar so as to impart a frictional gripping force to approximately one-half of the shaft's perimeter.

Forces are thus established which lock the collar to the shaft so that the collar will be rigidly positioned against accidental longitudinal and rotational displacement on the shaft. Preferably, the shaft bore 10, where the pin contacts the shaft, is recessed at 11. This is done so that when the pin is driven out of the opening 6, in removing the collar from the shaft, any metal displaced on the shaft, produced by the wedging action of the pin, will not interfere with longitudinal sliding movement of the collar on the shaft, permitting the parts to be disassembled with rapidity and convenience.

In Fig. 5, the locking pin 12 has been shown as being substantially V-shaped in cross section, and the opening 13 therefor possesses a substantially similar design. Either type of pin may be employed with substantially equal facility and effectiveness. Usually, the pins are formed from high grade steel, which are die-forged and tempered.

Collars so constructed will withstand far greater rotational forces and end thrust than is ordinarily required. Collars, when so applied, will not vibrate and become loosened on a shaft, and may be easily shifted or removed by driving out the locking pin.

Preferably, the leading end of the pin should be beveled as shown in Figs. 2 and 4 of the drawings. This is a desirable feature in that when driving the pin, the initial contact of the beveled leading end will serve to diminish the clearance between the shaft and the bore of the collar, or, in a manner of speaking, to take up the slack between the collar and the opposite side of the shaft, before the further driving of the pin serves to establish a distortion of the collar, and a consequent frictional engagement of the shaft by the opposite side of the collar.

The beveling of the leading end of the tapered pin, serving in this manner will greatly decrease the amount of taper necessary to produce the required wedging action. It will be manifest that if the pin is provided with a relatively large amount of taper, the same will be subject to backing up or displacement out of the pin-receiving aperture, due to various vibrational forces set up during rotation.

In Fig. 4 of the drawing, the resilient distortion of the collar, when the pin has been driven completely therethrough, has been amplified somewhat to disclose the heretofore mentioned frictional engagement imparted by approximately one-half of the perimeter of the bore opposite to the position occupied by the pin in engagement with the shaft.

While I have primarily disclosed my invention as applicable to retaining collars, it will be manifest that the principle embodied in the preceding disclosure may be adapted for use in securing various other rotatable members such as gears, couplings and cams to an associated shaft. My invention is characterized by its mechanical efficiency, simplicity of construction and ease of operation.

I claim:

A shaft-retaining stop collar comprising an annular metallic body formed with a cylindrical bore for close-fitting application to a cylindrical shaft and a straight transversely disposed open-ended pin-receiving channel disposed perpendicularly to the axis of the bore and intersecting the bore chordwise on one side thereof, said body being recessed longitudinally on either side of the line of intersection of the pin-receiving channel with the shaft-receiving bore; and a smooth surfaced, hardened, longitudinally tapered locking pin formed at its smaller end with an outwardly beveled leading edge, said pin being arranged to be forcibly driven into the channel of said body and into tangential wedging engagement with the outer peripheral surface of a shaft received within the bore of said body, the beveled leading edge of said pin serving to initially crowd the shaft into engagement with the walls of said body defining the shaft-receiving bore without cutting the shaft.

ROY H. SECHRIST.

REFERENCES CITED

The following references are of record in the file of this patent:

UNITED STATES PATENTS

| Number | Name | Date |
|---|---|---|
| 331,522 | Meese | Dec. 1, 1885 |
| 739,511 | Spencer | Sept. 22, 1903 |
| 957,429 | Martin | May 10, 1910 |
| 972,292 | Thomas | Oct. 11, 1910 |
| 988,154 | Thiemer | Mar. 28, 1911 |
| 1,291,475 | Geist et al. | Jan. 14, 1919 |
| 1,417,161 | Fuegel et al. | May 23, 1922 |
| 1,534,776 | Eisiga | Apr. 21, 1925 |
| 1,563,186 | Haller | Nov. 24, 1925 |
| 1,976,489 | Gargan | Oct. 9, 1934 |
| 2,226,897 | Cole | Dec. 31, 1940 |

FOREIGN PATENTS

| Number | Country | Date |
|---|---|---|
| 6,416 | Sweden | May 30, 1895 |
| 16,007 | Great Britain | Aug. 4, 1905 |
| 671,920 | Germany | Feb. 16, 1939 |